United States Patent
Bremm

(10) Patent No.: US 6,851,393 B2
(45) Date of Patent: Feb. 8, 2005

(54) ANIMAL LEASH SYSTEM

(76) Inventor: Jim Bremm, 985 Powderhorn La., Southport, CT (US) 06430

( * ) Notice: Subject to any disclaimer, the term of this patent is extended or adjusted under 35 U.S.C. 154(b) by 43 days.

(21) Appl. No.: 10/379,150

(22) Filed: Mar. 4, 2003

(65) Prior Publication Data

US 2004/0194733 A1 Oct. 7, 2004

(51) Int. Cl.$^7$ ............................................. A01K 27/00
(52) U.S. Cl. ....................... 119/770; 119/797; 119/776; 119/772
(58) Field of Search ............................. 119/770, 797, 119/793, 795, 776, 772, 786, 787, 788, 792; D30/153

(56) References Cited

U.S. PATENT DOCUMENTS

| | | | |
|---|---|---|---|
| 2,333,488 A | 11/1943 | Parth | |
| 2,356,715 A | 8/1944 | Webster | |
| 3,295,501 A | * 1/1967 | Marbury | 119/770 |
| 3,311,088 A | * 3/1967 | Peterlin | 119/793 |
| 4,879,972 A | * 11/1989 | Crowe et al. | 119/792 |
| 5,038,719 A | 8/1991 | McDonough | |
| 5,161,486 A | 11/1992 | Brown | |
| 5,174,246 A | 12/1992 | Driver | |
| D350,628 S | 9/1994 | Williams | |
| D359,599 S | * 6/1995 | Archambault | D30/153 |
| 5,456,213 A | 10/1995 | Beauchamp | |
| 5,709,172 A | 1/1998 | Maglich | |
| 5,718,189 A | 2/1998 | Blake | |
| 5,950,569 A | 9/1999 | Perrulli | |
| 6,192,835 B1 | 2/2001 | Calhoun et al. | |
| D454,670 S | * 3/2002 | Weller | D30/153 |
| 6,422,176 B1 | * 7/2002 | Tonuzi | 119/770 |
| 6,450,129 B1 | 9/2002 | Flynn | |
| 2002/0195065 A1 | 12/2002 | Moulton, III | |

* cited by examiner

Primary Examiner—Yvonne R. Abbott
(74) Attorney, Agent, or Firm—Law Office of Leo Zucker

(57) ABSTRACT

An animal leash system includes a leash of flexible material having near and far ends, and a belt arranged to be worn about a person's body. A connector is fastened to the belt for operation by the person while wearing the belt. A handle is formed at the near end of the leash, and the handle is engageable with the connector on the belt. The far end of the leash is fastened to an animal collar. An associated restraining strap is fixed to the leash and is arranged for securing about an anchored object such as a tree or post. Thus, the person can (I) secure the restraining strap about the object before disengaging the leash handle from the connector on the belt, and (ii) engage the leash handle with the belt connector before releasing the restraining strap from the object. The animal is therefore always safely restrained either by the person's belt or by the fixed object.

11 Claims, 4 Drawing Sheets

ANIMAL LEASH SYSTEM

BACKGROUND OF THE INVENTION

1. Field of the Invention

This invention relates to leash arrangements for dogs and other domesticated animals.

2. Discussion of the Known Art

It is known generally to fasten a near (proximal) end of a dog leash to a belt that is worn by a person, in order to allow the person to have both hands free while walking the animal. For example, U.S. Pat. No. 2,333,488 (Nov. 2, 1943) and U.S. Pat. No. 2,356,715 (Aug. 22, 1944) disclose dog leash arrangements for use by the armed forces in sentry, scouting and patrol work. A belt is worn about a soldier's waist or upper body, and the near end of the leash is fastened to a swivel connector provided on the belt. Thus, the soldier has both hands available to operate a search light, weapon or the like while the dog at the far (distal) end of the leash remains tethered to the soldier's belt.

Similar leash and waist belt arrangements have been recently disclosed for use by dog owners who want to run or jog alongside their pets while keeping them on leash. See, e.g., U.S. Pat. No. Des. 350,628 (Sep. 13, 1994); and U.S. Pat. No. 6,450,129 (Sep. 17, 2002); U.S. Pat. No. 6,192,835 (Feb. 27, 2001); U.S. Pat. No. 5,950,569 (Sep. 14, 1999); U.S. Pat. No. 5,161,486(Nov. 10, 1992) and U.S. Pat. No. 5,038,719 (Aug. 13, 1991). Animal leashes configured to be attached to stationary posts, railings or the like while a pet owner enters a store or other facility where pets are not allowed, are also known. See, for example, U.S. Pat. No. 5,709,172 (Jan. 20, 1998); U.S. Pat. No. 5,456,213 (Oct. 10, 1995) and U.S. Pat. No. 5,174,246 (Dec. 29, 1992).

As far as is known, however, a leash arrangement that allows a pet owner to (1) maintain his or her hands free while walking or running with their pet, (2) secure the animal to a post, tree or railing temporarily while the owner enters a building where animals are prohibited, and (3) restrain the pet safely at all times even when changing over between conditions (1) and (2), has not been disclosed.

SUMMARY OF THE INVENTION

According to the invention, an animal leash system includes a flexible leash having a near end and a far end. A belt is adapted to be worn about a person's body, and a connector is fastened to the belt for access by the person. A handle formed at the near end of the leash is arranged to engage the connector on the belt, and the far end of the leash is arranged for fastening on an animal collar or harness. A restraining strap is fixed to the leash intermediate the near and the far ends of the leash, and the strap is configured to be secured about a stationary object such as, e.g., a tree, post or railing. Accordingly, the person can (i) place the restraining strap about the object before disengaging the handle at the near end of the leash from the connector on the belt, and (ii) engage the handle at the end of the leash with the connector on the belt before removing the restraining strap from the stationary object. The animal is therefore safely restrained by the leash at all times.

According to another aspect of the invention, an animal leash includes a leash part of flexible material having a near end and a far end. A handle is formed at the near end and is arranged to engage a connector on a belt to be worn about a person's body. The far end of the leash part is arranged to be fastened on an animal collar or harness. A restraining strap part is fixed to the leash part intermediate the near and the far ends of the leash part, and the strap is configured to be secured about a stationary object such as a post, tree or rail. Accordingly, the person can (i) place the restraining strap about the object before disengaging the handle at the near end of the leash part from the connector on the belt, and (ii) thereafter engage the handle of the leash part with the connector on the belt before removing the restraining strap from about the object. The animal is therefore safely restrained by the leash part at all times.

For a better understanding of the invention, reference is made to the following description taken in conjunction with the accompanying drawing and the appended claims.

DESCRIPTION OF THE INVENTION

Figure 1:
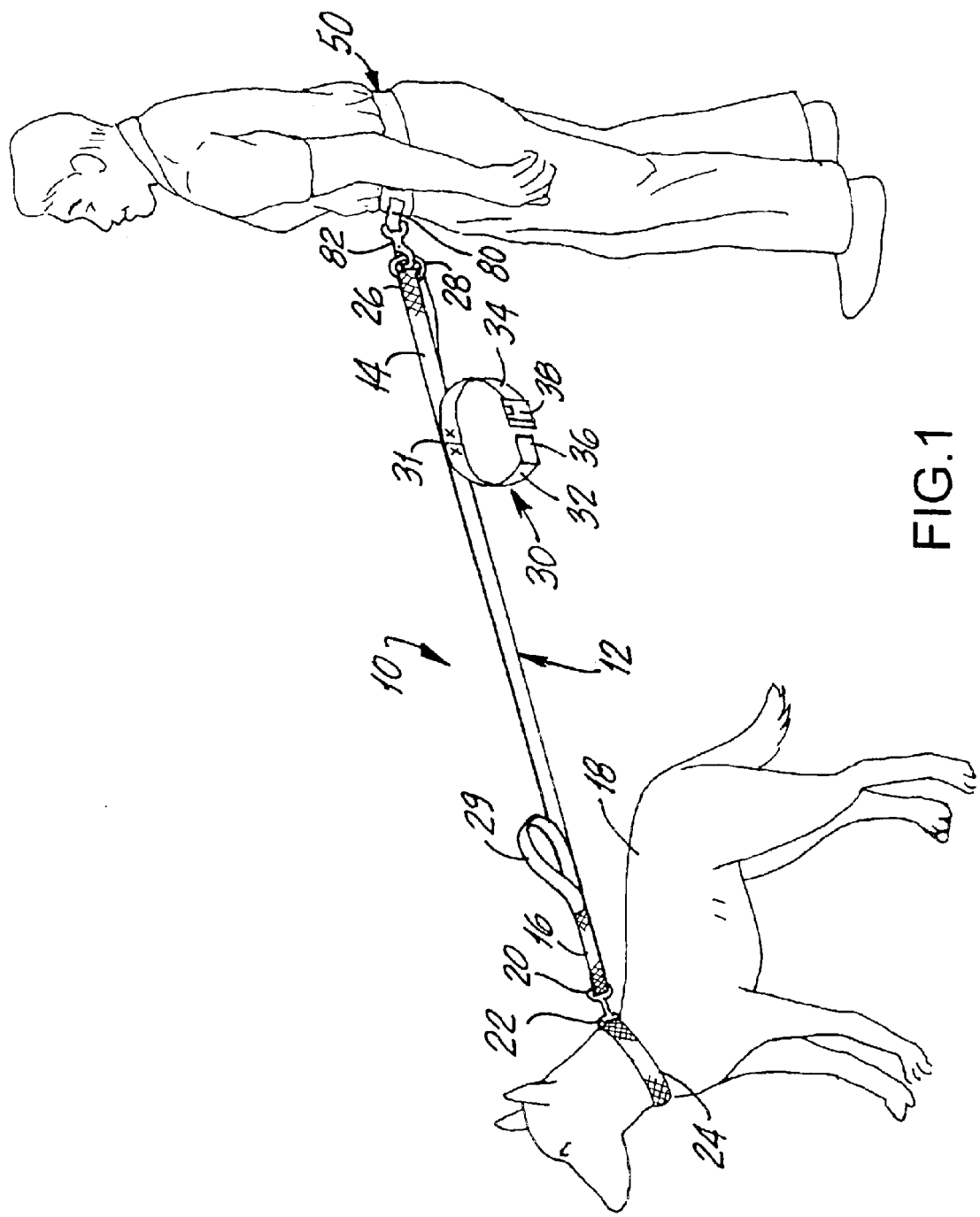
FIG. 1 illustrates an animal leash system according to the invention, in a first configuration.

FIG. 1 is a pictorial representation of an animal leash system 10 according to the invention. The system 10 includes a leash 12 of flexible material having a near (or proximal) end 14, and a far (or distal) end 16 opposite the near end 14. Preferably, the leash 12 is made of a flexible material such as two-ply nylon of sufficient width (e.g., one inch) to withstand tension forces when transmitted through the leash 12 by an animal such as a large dog 18. A rough estimate of such forces may be obtained, for example, by multiplying the dog's weight by three. As seen in FIG. 1, the far end 16 of the leash 12 terminates with a conventional snap hook fastener 20 for engaging a ring 22 on an animal harness or collar 24. The overall length of the leash 12 may be approximately four to six feet. A handle 26 is provided at the near end 14 of the leash 12. Handle 26 may be formed, e.g., by a loop of the leash material that is stitched closed in a conventional manner. A steel ring 28 (see FIG. 4) is provided to slide freely along the handle loop. The ring 28 may be the same or equivalent to one produced by the Lehigh Group of Macungie, Pa., USA as type 7065. A second handle 29 may be formed at the far end 16 of the leash to allow a person to gain a close hold on the leashed animal, near the animal's collar 24.

Figure 4:
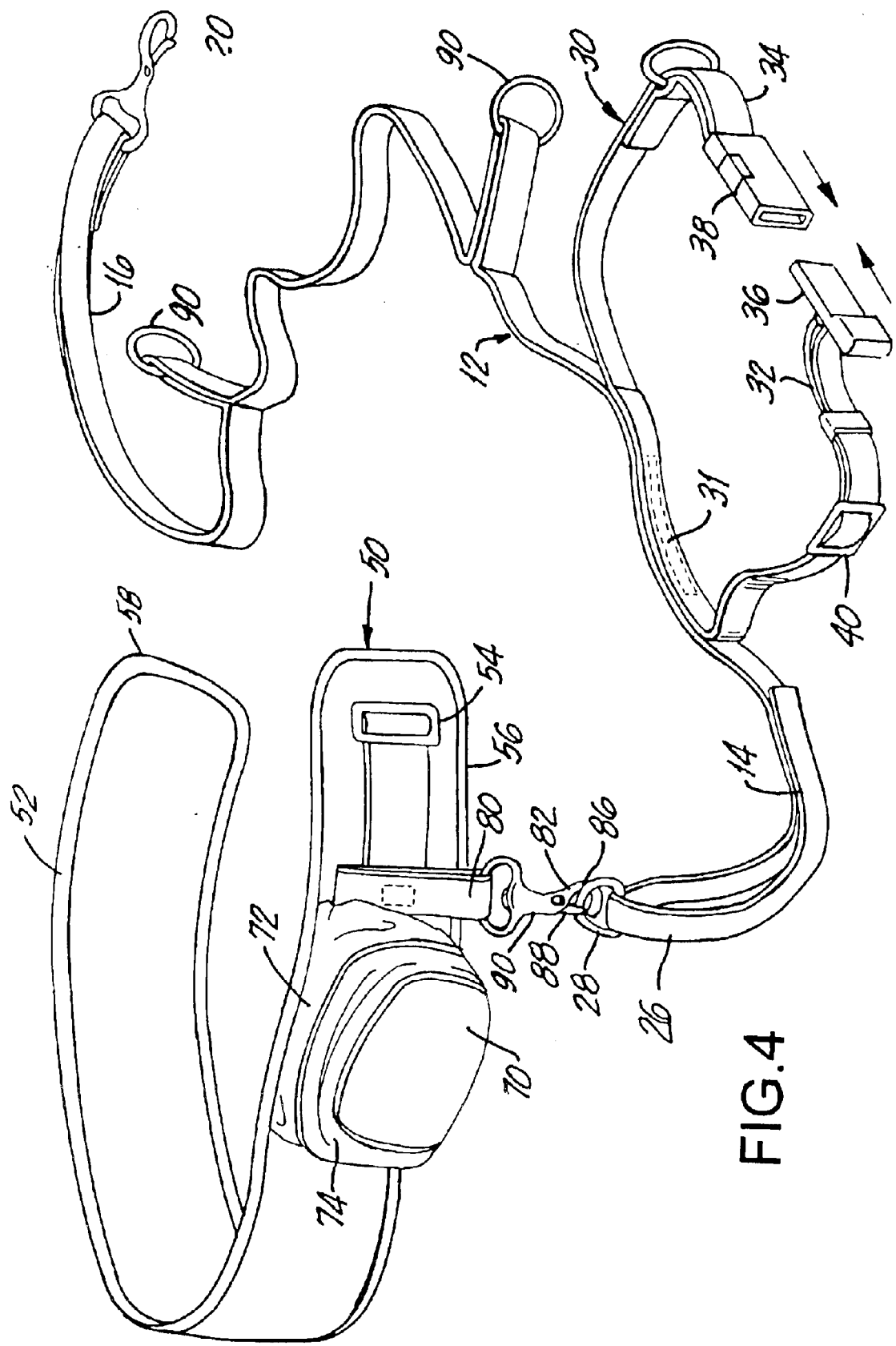
FIG. 4 is a perspective view of the leash system including an associated restraining strap.

A restraining strap 30 is fixed to the leash 12 intermediate the near and the far ends of the leash. In the illustrated embodiment, a medial portion 31 of the strap is stitched or otherwise fastened to the leash near the leash handle 26. As seen in FIG. 4, opposite ends 32, 34 of the restraining strap 30 may be fastened to one another by associated mating buckle connectors 36, 38 that are secured at the strap ends 32, 34. The restraining strap 30 may be formed of flexible material the same or equivalent to that of the leash 12, e.g., two-ply nylon approximately one-inch wide. The overall length of the strap 30 is typically between 16 and 26 inches. A conventional "take-up" buckle arrangement 40 may be provided at one of the strap ends to allow the overall strap length to be set as desired within certain limits.

The animal leash system 10 also includes a waist belt 50 which is shown in detail in FIG. 4. The belt 50 may be in the form of, for example, a weight lifter's belt with a waist strap 52 having a sturdy, flexible web body up to about three inches wide. In the illustrated embodiment, the waist strap 52 has a plastics buckle 54 fixed on one end 56 of the strap visible in FIG. 4. A fastening belt (not shown) has one end fixed on an opposite end 58 of the waist strap 52, and the fastening belt is dimensioned and arranged so that its opposite end can be drawn through the buckle 54, pulled taught, and urged against a confronting portion of the fastening belt. Layers of hook and loop material provided on the confronting belt portions then engage one another, thus keeping the entire waist belt 50 securely fastened about a user's waist. The waist belt 50 may be made available in more than one overall size to accommodate men and women of various builds, for example, small, medium and large.

A pouch 70 may be stitched or otherwise fastened on an outside surface of the waist belt 50. The pouch 70 can be formed of nylon cloth or equivalent material, and its primary function is to contain a supply of disposable "clean up" bags for the convenience of pet owners who must obey sanitation laws applicable to all persons who walk their pets on public property in most cities. In the disclosed embodiment, the pouch 70 has a main compartment covered by a zippered top flap 72, and an additional compartment that is closed by a second zippered flap 74, as shown in FIG. 4.

A loop 80 is provided on the waist belt 50 at a location within reach of a person when wearing the belt 50. The loop 80 may be formed of the same or similar material as the leash 12, and is stitched or otherwise securely fastened on the belt 50 so as to withstand forces expected to be exerted by an animal restrained by the leash 12. A swivel, snap hook connector 82 has a ring part 84, and the ring part engages the loop 80 on the waist belt 50. The hook connector 82 may be the same or equivalent to one produced by the earlier mentioned Lehigh Group as type 7002. The connector 82 has a "C"-shaped body part 86 into which the ring 28 on the leash handle 26 can be inserted, after a spring biased rod 88 is operated via a thumb button 90 formed on the rod 88. The dog 18 or other leashed animal is then safely tethered to the belt 50 once the belt is fitted about the person's waist and the fastener 20 at the far end 16 of the leash 12 is engaged with the ring 22 on the animal collar 24. The person is then able to walk, run or jog with both hands free, as in FIG. 1.

Figure 2:
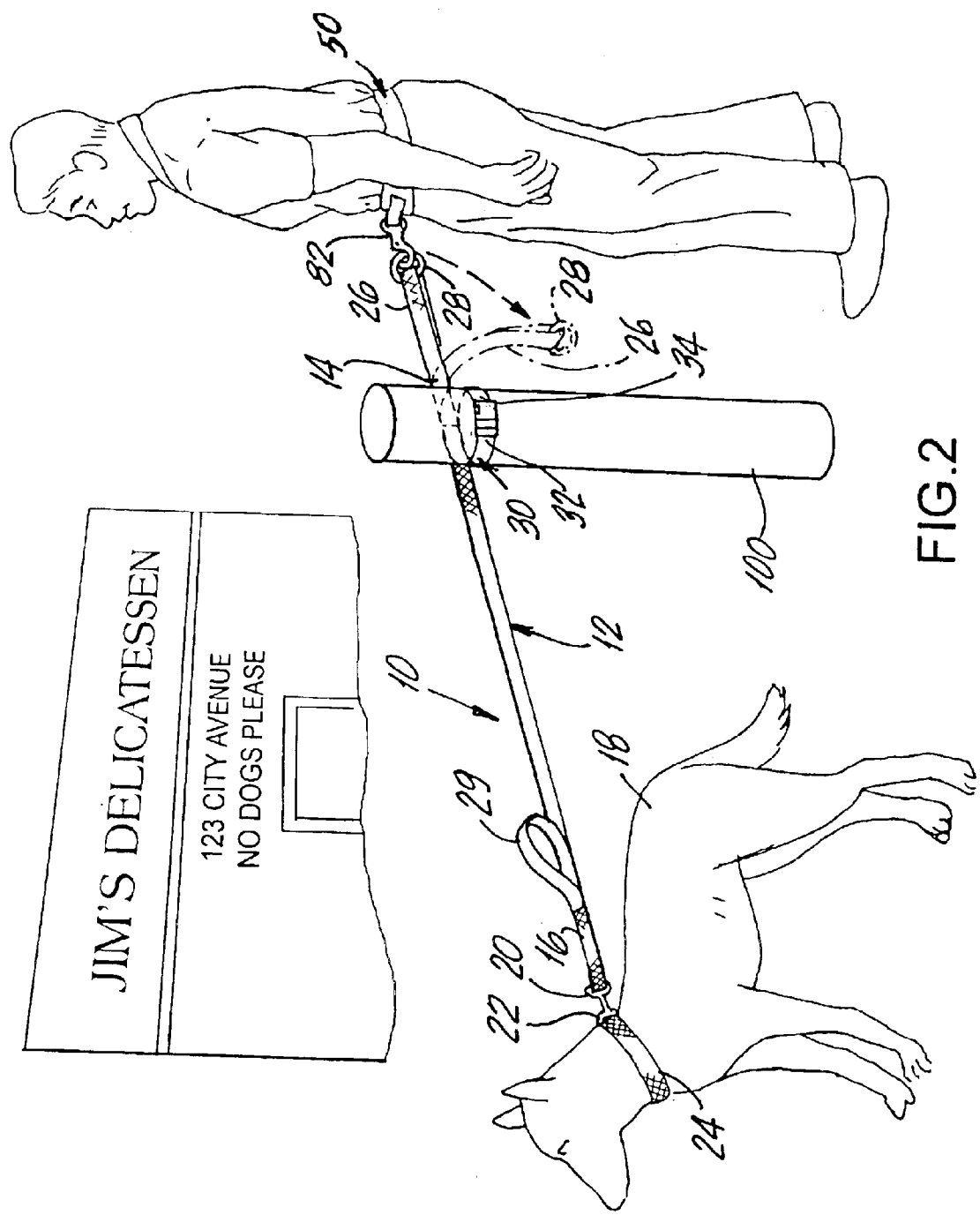
FIG. 2 illustrates the leash system in transition from the first configuration in FIG. 1 to a second configuration.

FIG. 2 shows the leash system 10 in transition from the configuration of FIG. 1, to a second configuration. Specifically, the person walking the dog 18 has the near end 14 of the leash 12 connected to his waist belt 50, and is about to enter a food store where no dogs are allowed. Before unfastening the leash handle 26 from the waist belt 50, the person secures the restraining strap 30 about a fence post 100 which is anchored in the ground near the store entrance. The strap 30 is disposed about the post 100, and the opposite ends 32, 34 of the strap 30 are fastened to one another to secure the strap in place. Next, the person releases the leash handle 26 by operating the thumb button 90 on the waist belt connector 82, as shown by the dashed arrow and lines in FIG. 2, leaving the person free to enter the store. Thus, the dog 18 is safely restrained by the leash 12 which remains connected at all times either to the waist belt 50 on the person, or to the restraining strap 30 once secured about the post 100. This feature of the leash system 10 is significant in that there is no chance that the person will be caught off guard should the dog suddenly lurch toward another animal or person when transitioning from the configuration of FIG. 1 to that of FIG. 2.

Figure 3:
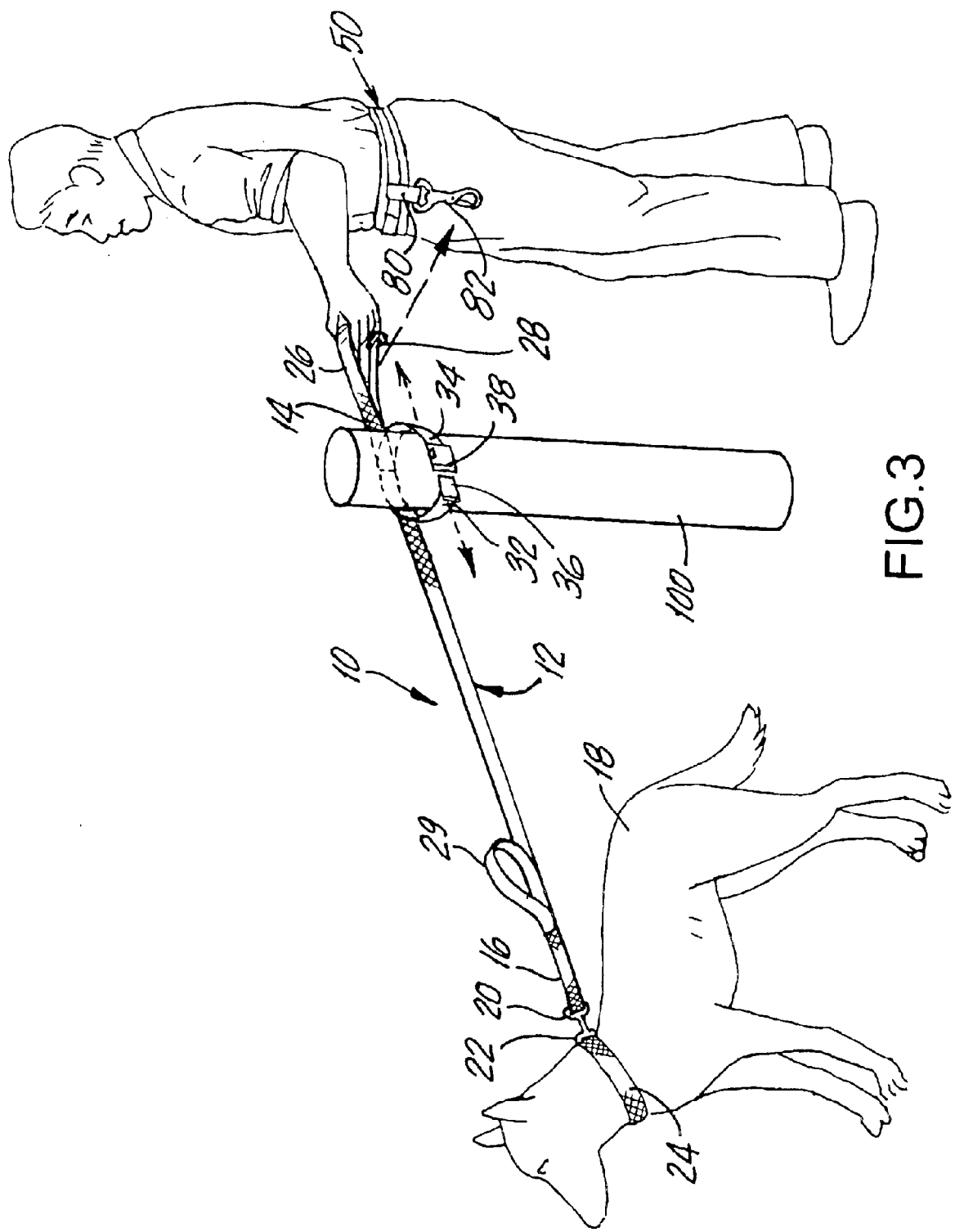
FIG. 3 illustrates the leash system in transition from the second configuration to the first configuration.

FIG. 3 shows the leash system 10 with the restraining strap 30 secured about the post 100 as in FIG. 2, and with the person wearing the waist belt 50 having left the store and being ready to resume walking the dog 18. Before opening the strap ends, 32, 34, the person grasps the leash handle 26 and engages the ring 28 on the handle with the connector 82 on his waist belt 50, as indicated by the dashed arrow in FIG. 3. Once the leash handle is fastened to the waist belt 50, the confronting ends of the restraining strap 30 are unfastened from one another and the strap is removed from the post 100. Again, the dog is restrained by the leash 12 which remains connected at all times during the transition either to the post 100 or to the waist belt 50 on the person.

While the foregoing represents a preferred embodiment of the invention, it will be understood by those skilled in the art that various modifications and changes may be made without departing from the spirit and scope of the invention. For example, a person desiring to walk two or more dogs simultaneously can wear the single waist belt 50, and attach more than one leash 12 onto the belt connector 82 via the handle ring 28 of each leash. Alternatively, the waist belt 50 may be provided with more than one connector 82 each for attachment of a different leash. Also, additional rings 90 (FIG. 4) similar to the handle ring 28 may be fixed on the leash 12 at positions intermediate the near and the far ends 14, 16 of the leash, thus enabling the person effectively to shorten the length of the leash between the belt 50 and the animal by connecting a selected intermediate ring 90 on the leash to the belt connector 82. Accordingly, the invention includes all such modifications and changes as come within the scope of the following appended claims.

I claim:

1. An animal leash system, comprising;
   an elongated leash of flexible material having a near end, and a far end opposite the near end;
   a belt adapted to be worn about a person's body, and a connector fastened to the belt so as to be accessible by the person while wearing the belt;
   a first handle formed at the near end of the leash and arranged to engage the connector on the belt;
   the far end of the leash is constructed and arranged to be fastened to an animal collar or harness; and
   a restraining strap constructed and arranged to be disposed about a stationary object, and part of the restraining strap is fixed to the leash intermediate the near and the far ends of the leash;
   wherein the person can (i) secure the restraining strap about said object prior to disengaging the first handle at the near end of the leash from the connector on the belt, and (ii) engage the first handle at the near end of the leash with the connector on the bet prior to removing the strap from about said object, and
   wherein the restraining strap has mating connectors at free ends of the strap so that the free ends can be joined to one another after the strap is disposed about the stationary object.

2. A leash system according to claim 1, including a ring disposed on the first handle for engagement with the connector fastened to the belt.

3. A leash system according to claim 1, wherein the restraining strap is fixed to the leash at a position near the first handle.

4. A leash system according to claim 1, including a second handle formed in the vicinity of the far end of the leash.

5. A leash system according to claim 1, including more than one leash so that two or more animals can be tethered to the belt via a corresponding leash.

6. A leash system according to claim 1, including one or more rings fixed at positions intermediate the ends of the leash for selective engagement with the connector on the belt.

7. A leash system according to claim 1, wherein the belt is configured to be worn about the person's waist.

8. An animal leash, comprising:

an elongated leash part of flexible material having a near end, and a far end opposite the near end;

a first handle formed at the near end of the leash part so as to be grasped by a person when walking an animal;

a ring member disposed on the first handle for engaging a connector on the person's belt;

the far end of the leash part is constructed and arranged to be fastened to a collar or harness on the animal; and a restraining strap constructed and arranged to be disposed about a stationary object, and the strap is fixed to the leash part intermediate the near and the far ends of the leash part;

wherein the restraining strap has mating connectors at free ends of the strap so that the free ends can be joined to one another after the strap is disposed about the stationary object;

so that the person can secure the restraining strap about said object prior to disengaging the ring member on the first handle at the near end of the leash part from the connector on the belt, and (ii) engage the ring member on the first handle at the near end of the leash part with the connector on the belt prior to removing the restraining strap from about said object.

9. A leash according to claim 8, wherein the restraining strap is fixed to the leash part at a position near the first handle.

10. A leash according to claim 8, including a second handle formed in the vicinity of the far end of the leash part.

11. A leash according to claim 8, including one or more rings fixed at positions intermediate the ends of the leash part for selective engagement with the connector on the belt.

\* \* \* \* \*